ions the tool on one of
United States Patent
Jaeger et al.

[15] 3,665,579
[45] May 30, 1972

[54] PIPE TOOL

[72] Inventors: Robert Francis Jaeger, 7264 Edwards St., New Orleans, La. 70126; Ernest Frederick King, Jr., 4212 Wichita St., Metairie, La. 70001

[22] Filed: Oct. 24, 1969

[21] Appl. No.: 869,049

[52] U.S. Cl. ............................................. 29/237, 29/267
[51] Int. Cl. ........................................................ B23d 19/04
[58] Field of Search ............................. 29/237, 238, 203, 267

[56] References Cited

UNITED STATES PATENTS

| | | | |
|---|---|---|---|
| 3,181,234 | 5/1965 | Gill | 29/237 |
| 3,471,919 | 10/1969 | Evans | 29/237 |
| 3,483,608 | 12/1969 | Madden | 29/237 |
| 3,101,192 | 8/1963 | Stinson | 29/267 X |
| 3,059,785 | 10/1962 | Buckeye | 254/8.2 X |

Primary Examiner—Andrew R. Juhasz
Assistant Examiner—Leon Gilden
Attorney—Shanley and O'Neil

[57] ABSTRACT

Pipe joining and disjoining tool which includes an operating lever having a yoke at one end. Another yoke is pivoted to the yoke on the operating lever, for mounting the tool on one of the pipes to be joined. A chain is secured to the other pipe, and extends upwardly through a passageway in the operating lever. To join the pipes, the chain is tautened and locked in a slot at the top of the operating lever, which is then swung downwardly to tightly draw the pipes together. For disjoining pipes, the tool includes a disjoining member having a third yoke which is mounted on the yoke on the operating lever and which can be pivotally moved away from the operating lever. The chain is pulled taut and is locked in a slot in the disjoining member, and the pipes are disjoined by swinging the operating lever in a direction opposite the direction of swinging for joining the pipes.

12 Claims, 8 Drawing Figures

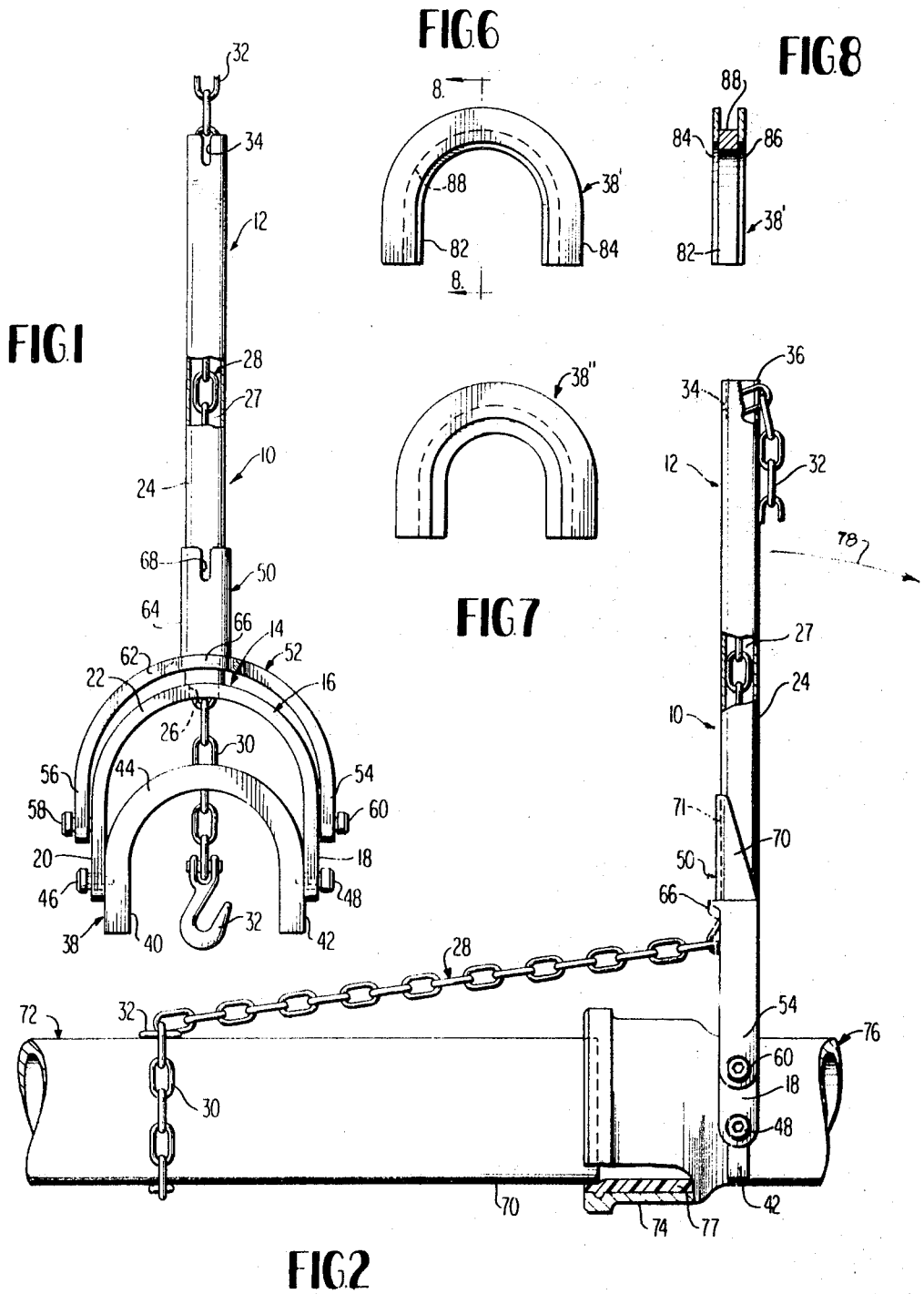

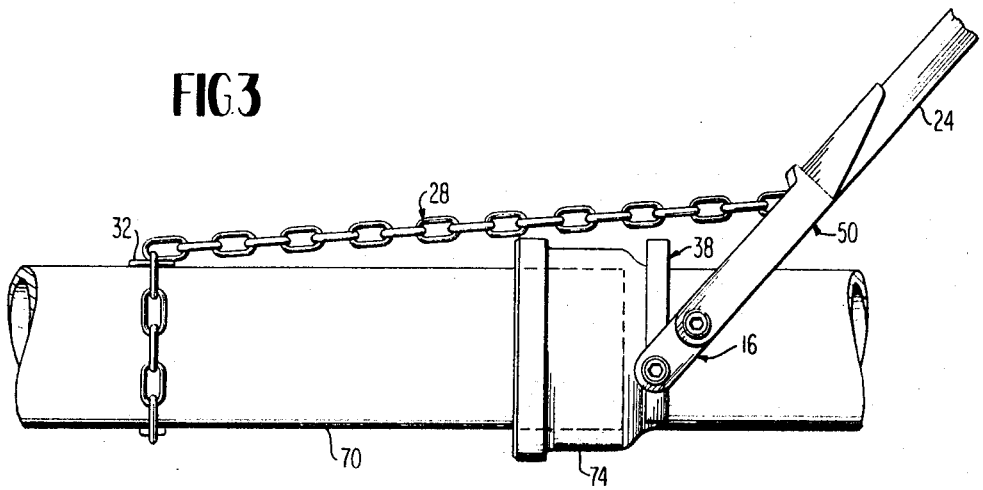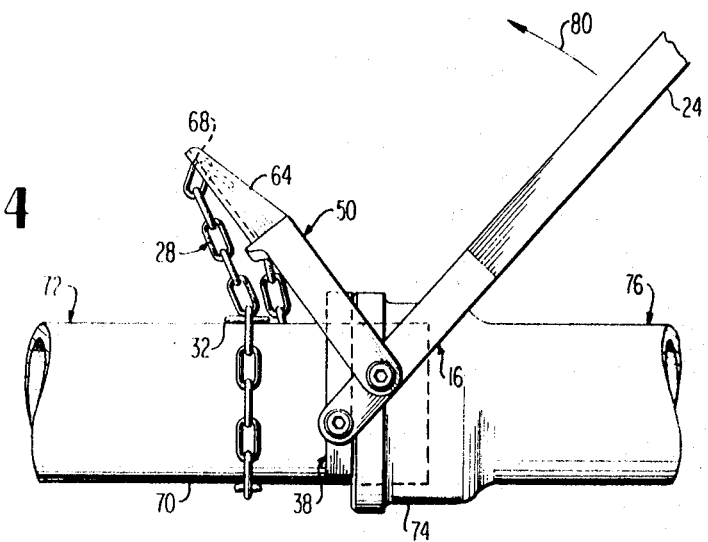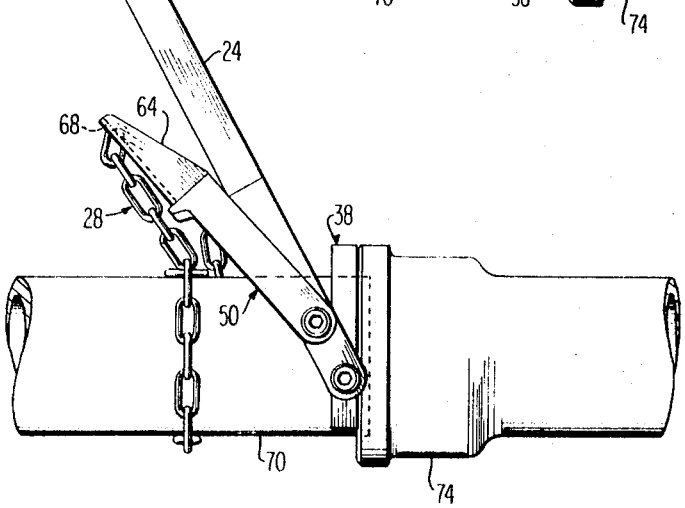

3,665,579

PIPE TOOL

BACKGROUND OF THE INVENTION

This invention relates to pipe tools, and more particularly to devices for joining and disjoining cast iron soil pipes.

The advent of compressible elastomeric seals for forming fluid-tight joints in bell-and-spigot soil pipes created a need for tools which can apply large, axially directed forces to the pipes. Such forces are necessary to compress the elastomeric seal and tightly insert the spigot end of one pipe into the bell end of another.

To meet this need, numerous tool structures have been proposed in the prior art. However, the tools proposed heretofore have had some disadvantage or deficiency which has prevented their being entirely satisfactory. For example, it is often necessary that a pipe tool be used in confined working areas and in making overhead or vertical installations, and many prior art tools are too awkward, inconvenient, heavy and bulky to use under such working conditions. Also, it is sometimes necessary to disjoin pipes and large forces are necessary to disjoin pipes because of the tight compression of the elastomeric seal, but some prior art tools include no provision for disjoining.

Further, with many prior art tools, it is difficult to adjust the tool into accurate gripping and force-applying relation to the pipes, because complex mechanical clamps and other devices are employed. Moreover, many tools of the prior art are not well adapted for use with pipe fittings as well as straight pipe sections. Also, the design and operation of many prior art tools is too complex for rapid, efficient pipe-joining operations, and the complexity of design is further disadvantageous in increasing the cost of the tool. Still further, it is necessary to fit many prior art tools with complex adapters by a cumbersome and difficult procedure when pipes of differing sizes are encountered.

Accordingly, main objects of the invention are the provision of improved pipe tools which overcome the disadvantages of the prior art and which are lightweight, compact, convenient to use in confined quarters and in overhead and vertical installations, which can be used to disjoin pipes, which are easy to adjust into proper joining or disjoining relation to the pipes, which are simple in design and inexpensive to construct, and which operate rapidly, easily and efficiently, and which are easy to use with pipe fittings as well as straight pipe sections.

Other objects of the invention will appear from the following detailed description which, in connection with the accompanying drawings, discloses a preferred embodiment of the invention for purposes of illustration only and not for determining the limits of the invention. For defining the scope of the invention, reference will be made to the appended claims.

BRIEF DESCRIPTION OF THE DRAWINGS

FIG. 1 is a front view of a pipe tool embodying principles of the invention.

FIG. 2 is a side view of the tool of FIG. 1 in starting position for joining pipes.

FIG. 3 shows the structure of FIG. 2 in a later position of the pipe-joining operation.

FIG. 4 is a side view of the tool of FIG. 1 in starting position for disjoining pipes.

FIG. 5 shows the structure of FIG. 4 in a later position of the disjoining operation.

FIGS. 6 and 7 are front views of adapting yokes employed for pipes of varying sizes.

FIG. 8 is a cross-sectional view on line 8—8 of FIG. 6.

DESCRIPTION OF THE PREFERRED EMBODIMENT

FIG. 1 depicts a pipe tool structure including an elongated operating lever 10 having spaced-apart upper and lower end portions 12, 14. Lower end portion 14 includes a forked member or yoke 16 having parallel arms 18, 20, and an arcuate bight portion 22 joining the arms. Bight 22 is welded to an elongated tubular member 24 forming in a handle portion of operating lever 10. An aperture 26 is formed in bight portion 22 of yoke member 16. Aperture 26 and the open internal cross-section of tubular member 24 communicate with one another and thus cooperate to define an elongated passageway 27 which extends from lower end portion 14 to upper end portion 12 of operating lever 10. Passageway 27 had opposite open ends, and tubular member 24 has a generally square cross-sectional configuration.

An elongated, flexible tension member in the form of a chain 28 extends the entire length of passageway 27, and extends outwardly from each open end of the passageway. The portion of the chain in passageway 27 is confined by the walls of the passageway against movement in a direction transverse to the operating lever, for purposes to be described.

Chain 28 has a pipe-securing end portion 30 which projects outwardly from the lower end portion of passageway 27, and which terminates in a hook 32. The hook is provided to secure a pipe to the chain. A portion 32 of chain 28 projects outwardly from the upper open end portion of passageway 27, for adjusting the operative length of chain 28.

Upper end portion 12 of operating lever 10 includes walls defining identical, opposed slots 34, 36 (see also FIG. 2) for locking chain 28 to upper end portion 12 of operating lever 10 by inserting a link of the chain into one of the slots. The slots are formed in the front and rear faces of tubular member 24, and when a link is inserted in one of the slots at the upper end or locking portion of the operating lever, chain 28 is effectively secured against longitudinal movement in passageway 27.

Another yoke 38 is pivotally carried by yoke 16 and serves to mount operating lever 10 on a pipe. Yoke 38 is received in yoke 16, and has parallel arms 40, 42 connected by an arcuate bight portion 44 to define a downwardly open recess for receiving a pipe. Yoke 38 is pivotally mounted on operating lever 10 by pins 46, 48 passing respectively through aligned holes in arms 18, 20 of yoke 16. Pins 46, 48 are respectively threadedly received in tapped holes in the arms of yoke 38. Each pin is surrounded by a sleeve bearing in the respective arm of yoke 16, so that the pins freely rotate in the holes in the arms of yoke 16.

The tool includes a disjoining member 50 for disassembling pipe joints. Disjoining member 50 has one end portion pivotally mounted on yoke 16, and an opposite free end portion which can be swung towards and away from operating lever 10. The pivotally mounted end portion of disjoining member 50 includes a yoke 52, which receives yoke 16 and has parallel arms 54, 56 mounted on the arms of yoke 16 for pivotal movement at a location spaced above the location at which yoke 38 is mounted on yoke 16. Pivot pins 58, 60 mount the arms of yoke 52 on yoke 16.

Yoke 52 includes an arcuate bight portion 62 connecting arms 54, 56, and disjoining member 50 includes an outwardly projecting, channel-shaped member 64 which is welded to bight 62. Yoke 52 includes a reinforcing lug 66 at its juncture with channel-shaped member 64. The front face of channel-shaped member 64 includes walls defining a slot 68 which is similar to the slots at the top of the operating lever, for locking chain 28 to the free end portion of disjoining member 50 by inserting a chain link in slot 68.

Channel-shaped member 64 has an opposed pair of side walls, as at 70, which are joined to opposite marginal edges of the front wall. The inside faces of the front and side walls define a channel 71 having a configuration conforming to the outer cross-section of tubular member 24 of operating lever 10, to receive the operating lever so that disjoining member 50 can be pivoted to lie compactly against the operating lever when the disjoining member is not in use.

Operation of the tool for joining pipes will be discussed with reference to FIGS. 2 and 3, in which spigot end 70 of a pipe 72 is to be inserted in bell end 74 of another pipe 76. To form a joint, a conventional annular sealing gasket 77 is first inserted in bell 74, and either or both the spigot and gasket are lubricated in the conventional manner. Chain 28 is pulled downwardly through passageway 27 until a length sufficient to form a wrap at the desired location extends outwardly from the lower end portion of the passageway, End portion 30 of chain 28 is wrapped around pipe 72 at a location spaced from the end of pipe 72, as shown. The chain-gripping wrap is secured in position by inserting the point of hook 32 through a link in the chain.

The operating lever is then placed in position with yoke 38 over pipe 76 and abutting the outside shoulder of bell 74 to prevent slippage of the operating lever in a direction along the pipe centerline toward the free end of the bell. The operating lever is in generally upright disposition, and since disjoining member 50 is not employed in joining pipes, it is pivoted to lie compactly against the operating lever so as not to interfere with the joining operation.

The operator then grips the portion 32 of chain 28 which projects outwardly from the open upper end portion of operating lever 10. Chain 28 is pulled taut, and the chain link which is contiguous to the slot when the chain is taut is inserted in locking slot 34 or 36. With this one simple adjustment, the tool is accurately placed in condition for pipe-joining movement. The operator then grips the operating lever at the top for maximum leverage, and swings the operating lever in the direction of arrow 78. The operating lever pivots about the axis defined by the pins which pivotally mount yoke 38, while yoke 38 is firmly held in position by the shoulder of bell 74. The pivot axis is located below the pipe centerline, to aid in preventing the tool from riding off pipe 76.

Swinging the operating lever about its pivot axis causes spigot 70 to be drawn into bell 74 (FIG. 3) with great force, compressing the sealing gasket and firmly seating spigot 70 in bell 74. The pulling action on spigot 70 is applied through chain 28 which is in tension by virtue of the locking of the chain in slot 36, so the chain is not free to move longitudinally along the passageway in the operating lever as the chain would otherwise do upon swinging of the operating lever. It will now be appreciated that the lower end of the passageway in the operating lever by confining the chain against movement transverse to the operating lever, makes possible the obtention of mechanical advantage, the lower end portion of the passageway guiding the chain from the pipe-gripping wrap to the lower end portion of the operating lever so that forces applied to the top of the operating lever are multiplied by lever principles and transmitted to spigot 70. Further, the forces applied to spigot 70 are thus directed generally along the pipe centerline, for maximum vectorial efficiency. The lower end portion of the passageway is located close to the pipe centerline for maximum mechanical advantage and most vectorially advantageous force application. It will further be observed that passageway 27, by confining chain 28 along the entire length of the passageway, prevents the chain from interfering with the operator's motions.

In using the tool to disjoin pipe, disjoining member 50 is pivoted away from the operating lever into generally perpendicular disposition relative to the operating lever (FIG. 4). Chain 28 is wrapped around spigot 70 closely adjacent bell 74, as shown. A wrap of chain is hooked in chain-gripping relation to the pipe, and operating lever 24 is placed with yoke 38 over the spigot 70, abutting the free end shoulder of bell 74 with the operating lever projecting at an acute angle relative to the top of yoke 38. The chain is pulled taut up to the free end of disjoining member 50, and the link in the chain contiguous to slot 68 when the chain is taut is dropped into slot 68 in disjoining member 50. The operating lever is then gripped at the free upper end portion, and swung in the direction of arrow 80 to apply leverage along the disjoining member and thus tension the chain with a force having a vectorial component extending along the centerline of pipe 72 in a direction away from bell 74 and disjoin the pipes (FIG. 5). In disjoining pipes, the portion of the chain extending between slot 68 and the lower end of the passageway in the operating lever is not taut. However, chain 28 extends from slot 68 over and then under disjoining member 50 to the lower end portion of the passageway in the operating lever and the chain is still confined by the passageway from loosely flapping around and interfering with the operator's motions as he disjoins the pipe.

Soil pipe is provided in various sizes. Use of a chain to grip the spigot end makes it possible to grip any size of pipe without any adapter, because as much or as little chain as necessary can be wrapped around the pipe. Tool-mounting yoke 38 provides flexibility in that it can accommodate pipes of a number of sizes approaching the inside radius of the yoke. When very small pipes are encountered, adapter yokes as shown at 38' and 38" in FIGS. 6 and 7 respectively can easily be added to the tool to accommodate smaller and still smaller pipe sizes. Adapter yokes 38' and 38" differ from one another in that the inside radius of the bight of yoke 38" is smaller than that of yoke 38'. However, yokes 38' and 38" are otherwise similar in construction, so description of one imparts an understanding of both.

Adapter yoke 38' includes a U-shaped body portion 82 to which are welded opposed U-shaped cheek plates 84, 86 (see also FIG. 8). The cheek plates project radially outwardly from body portion 82 so as to define with the body portion a U-shaped, peripheral slot 88 conforming to the configuration of yoke 38 to receive yoke 38. Yoke 38' is slipped onto yoke 38 in a direction towards the bight of yoke 38 when it is necessary to fit the tool with the adapter. Yoke 38' can be held in position on yoke 38 in any convenient way, e.g., by removing pivot pins 46, 48 (FIG. 1), and replacing them with longer pins which pass entirely through the arms of yoke 38 and are threadedly received in tapped apertures in yoke 38'.

Tools according to the invention are highly advantageous. The tools are easy to use in confined working quarters and in making overhead or vertical installations, as well as in downhand operations. The tools are lightweight and compact. The tools disjoin pipes with the same ease with which pipes are joined, it being necessary only to swing disjoining member 50 away from tubular member 24 about the axis defined by pivot pins 58, 60, which is parallel to the pivot axis of the operating lever. In a tool employing principles of the invention, placement of the tool in proper relation to the pipes for joining or disjoining is a simple and rapid operation, requiring only one adjustment which is effected quite easily by tautening the chain and dropping the appropriate link into a locking slot.

Tools according to the invention are well adapted for joining pipe fittings as well as straight pipe sections, and as used herein the term "pipe" embraces not only straight pipe sections but also wyes, tees, bends and other pipe fittings. It will be appreciated that some pipes, e.g., stub sections, if desired can be gripped by placing hook 32 over the end of the pipe opposite spigot end 70, instead of wrapping the chain around the pipe.

Tools according to the invention are simple to construct and to operate, and simplicity of design makes possible the inexpensive manufacture of the tools. Still further, the number of adapters necessary to accommodate pipe of varying sizes is minimized, and adaptation is easily effected.

We claim:

1. Pipe tool structure, comprising
   an elongated operating lever having an end portion and having a lock portion spaced along the operating lever from the end portion,
   mounting means operatively associated with the end portion of the operating lever for mounting the operating lever on a pipe,
   means defining a confined passageway at the end portion of the operating lever,
   an elongated, flexible tension member having a pipe-securing portion and extending from the pipe-securing portion through the confined passageway at the end portion of the operating lever and extending from the end portion of the operating lever to the lock portion of the operating lever,
   securing means for securing the pipe-securing portion of the flexible tension member to a pipe,
   lock means for locking the flexible tension member to the lock portion of the operating lever, a disjoining member pivotally mounted on the end portion of the operating lever and having a free end portion, and second lock means for locking the flexible tension member to the free end portion of the disjoining member.

2. The structure of claim 1, the flexible tension member comprising a chain, the second lock means comprising means defining a slot in the free end portion of the disjoining member.

3. The structure of claim 1, the disjoining member including means defining a channel having a configuration conforming to the operating lever for receiving the operating lever.

4. The structure of claim 1, the mounting means comprising a first yoke member, the end portion of the operating lever including a second yoke member receiving the first yoke member.

the first yoke member being pivotally mounted on the second yoke member, the disjoining member including a third yoke member receiving the second yoke member and being pivotally mounted on the second yoke member at a location spaced toward the lock portion of the operating lever from the location at which the first yoke member is mounted on the second yoke member.

5. Pipe tool structure, comprising an elongated operating lever having an end portion and having a lock portion spaced along the operating lever from the end portion, means defining a confined passageway at the end portion of the operating lever, an elongated, flexible tension member having a pipe-securing portion and extending from the pipe-securing portion through the confined passageway at the end portion of the operating lever and extending from the end portion of the operating lever to the lock portion of the operating lever, securing means for securing the pipe-securing portion of the flexible tension member to a pipe, lock means for locking the flexible tension member to the lock portion of the operating lever, the elongated tension member being movable in a direction along its length relative to the confined passageway and relative to the lock means, and mounting means operatively associated with the end portion of the operating lever for swingably mounting the operating lever on a pipe, the mounting means comprising a first yoke member and a second yoke member, the second yoke member being joined to the end portion of the operating lever and receiving the first yoke member and the first yoke member being pivotally mounted on the second yoke member.

6. Pipe tool structure, comprising an elongated operating lever having an end portion and having a lock portion spaced along the operating lever from the end portion, mounting means operatively associated with the end portion of the operating lever for mounting the operating lever on a pipe, an elongated flexible tension member, securing means for securing the flexible tension member to a pipe, a disjoining member pivotally mounted on the end portion of the operating lever and having a lock portion spaced from the operating lever, first lock means for locking the flexible tension member to the lock portion of the operating lever, and second lock means for locking the flexible tension member to the lock portion of the disjoining member.

7. Pipe tool structure, comprising an elongated operating lever having opposite first and second end portions, a first yoke member, the first end portion of the operating lever including a second yoke member receiving the first yoke member, means pivotally mounting the first yoke member on the second yoke member, means defining a confined passageway at the first end portion of the operating lever, an elongated, flexible tension member having an end portion and extending from the end portion through the confined passageway at the first end portion of the operating lever and extending from the first end portion of the operating lever to the second end portion of the operating lever, securing means for securing the end portion of the flexible tension member to a pipe, first lock means for locking the flexible tension member to the second end portion of the operating lever, a disjoining member including a third yoke member pivotally mounted on the second yoke member, the disjoining member having a free end portion, and second lock means for locking the flexible tension member to the free end portion of the disjoining member.

8. The structure of claim 7, the flexible tension member comprising a chain.

9. The structure of claim 8, the first lock means comprising means defining a slot in the second end portion of the operating lever, the second lock means comprising means defining a slot in the free end portion of the disjoining member.

10. The structure of claim 9, the confined passageway being elongated and located within the operating lever and extending from the first end portion of the operating lever to the second end portion of the operating lever, the flexible tension member extending through the confined passageway from the first end portion of the operating lever to the second end portion of the operating lever.

11. Pipe tool structure, comprising an elongated operating lever having a first end portion and a second end portion, mounting means operatively associated with the first end portion of the lever for swingably mounting the lever on a pipe, lock means operatively associated with the second end portion of the lever, means defining a confined passageway in the lever, the confined passageway extending through the first end portion and through the lever from the first end portion to the lock means, an elongated flexible tension member in the confined passageway extending to the lock means and extending through the first end portion and terminating outside the passageway in a pipe-securing portion, the pipe-securing portion being adapted to secure the tension member of the pipe, and means associated with the tension member for securing the tension member to the lock means, the elongated tension member being movable in a direction along its length relative to the confined passageway and relative to the lock means.

12. Pipe tool structure as defined in claim 11 in which the elongated flexible tension member comprises a chain made up of links having a thickness dimension less than its width dimension and in which the lock means comprises means forming a slot in the lever having a width greater than the thickness dimension of the links and less than the width dimension of the links.

* * * * *